Patented Oct. 6, 1953

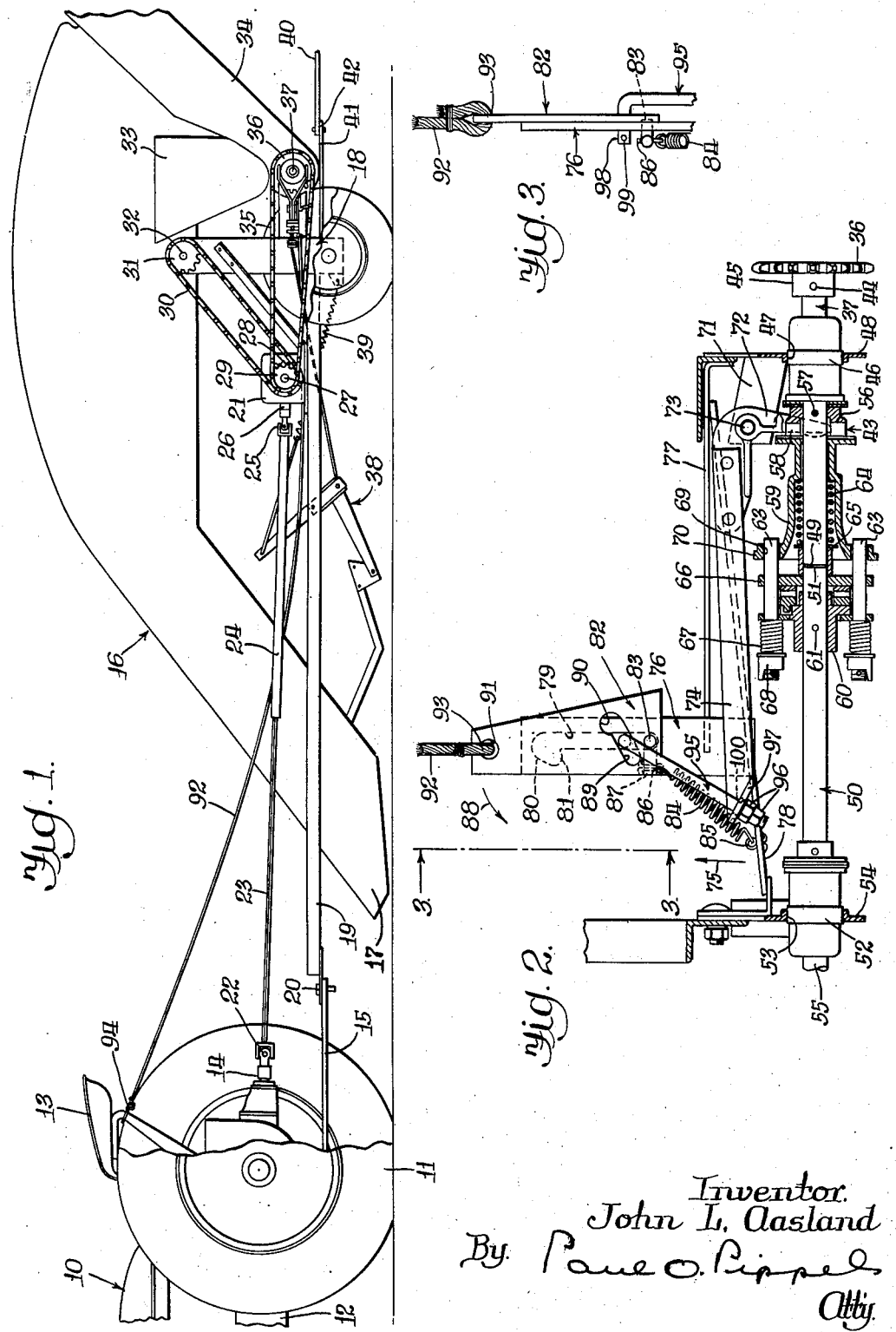

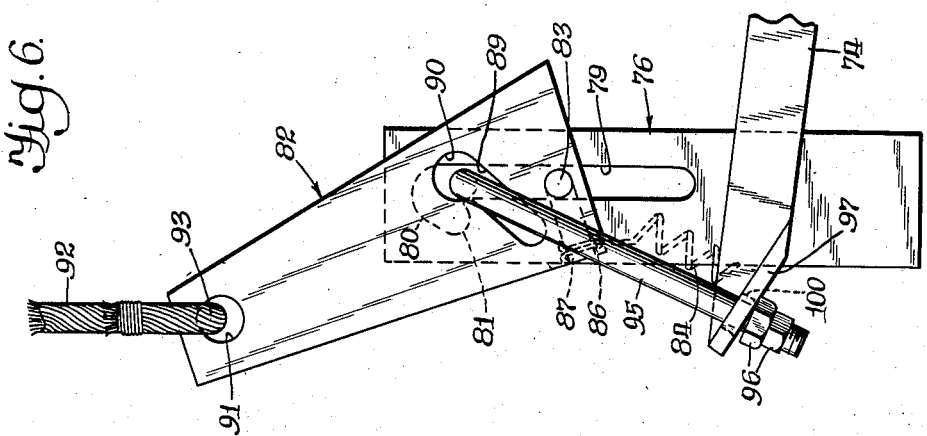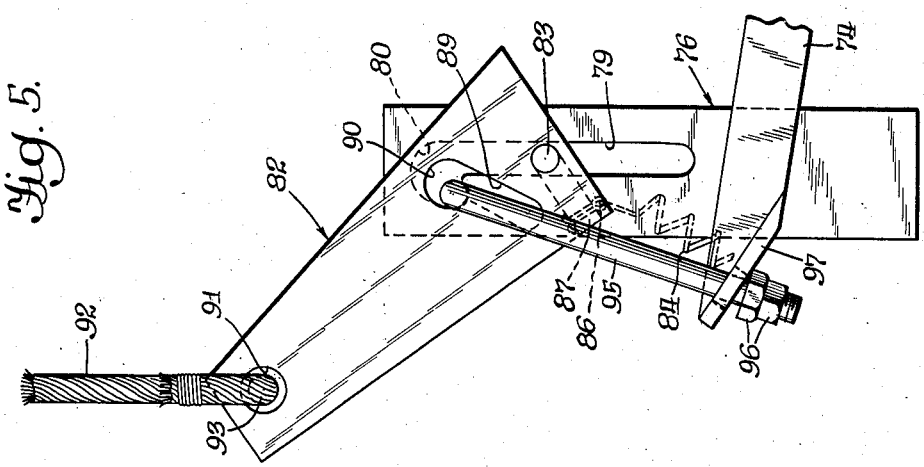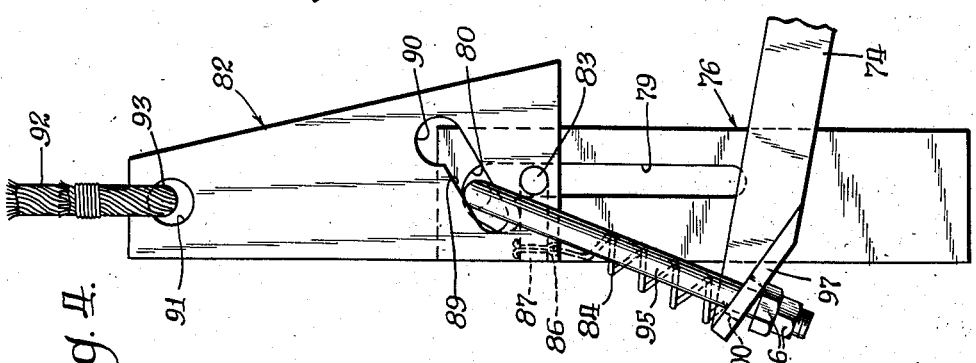

2,654,258

UNITED STATES PATENT OFFICE 2,654,258

REMOTE OPERATOR FOR WAGON ELEVATOR THROW-OUT CLUTCHES

John L. Aasland, Moline, Ill., assignor to International Harvester Company, a corporation of New Jersey Application June 21, 1952, Serial No. 294,815

5 Claims. (Cl. 74—99)

This invention relates to a new and improved remote operator for a wagon elevator throw-out clutch.

Certain agricultural implements, including corn pickers, employ elevators in association with the machine to elevate harvested crop for delivery to a trailing wagon. The wagon elevator, as a rule, is disposed at some fixed angle with respect to the harvesting portion of the machine and thus there are many occasions when the wagon elevator is not disposed directly over a hingedly mounted trailing wagon. In those instances when the discharge spout of the wagon elevator is not in alignment with the trailing wagon it is desirable to halt delivery of harvested crops by the elevator at those times. Thus clutch means are provided in the conveyor means of the wagon elevator to effect an engagement and/or disengagement of the wagon elevator driving means as desired. The problem of actuating the wagon elevator clutch means on a tractor pull-behind corn picker or other harvesting machines becomes complex by reason of the fact that the operator is positioned at such a great distance from the clutch means.

It is therefore a principal object of the present invention to provide a rope pull for a remote control operating means for the wagon elevator clutch operator.

An important object of this invention is to provide a rope pull means for a clutch actuator which will alternately effect engagement and then disengagement of a clutch merely upon successive pulls on a single rope or cable.

Another important object of this invention is the provision of means in a clutch actuator whereby the actuator may be locked in either clutch engaged or clutch disengaged positions.

Another important object of this invention is to supply a remotely controlled device for effecting movement between two limiting positions merely upon successive pulls on a flexible cable and to continue to alternately effect movement from one limiting position to the other upon succeeding successive pulls of the flexible cable.

Other and further important objects of this invention will become apparent from the disclosures in the following specification and accompanying drawings:

Fig. 1 is a side elevational view of a tractor and trailing corn picker.

Fig. 2 is a top plan view of the clutch and clutch actuator mechanism of this invention.

Fig. 3 is a detailed side elevational view of the device as viewed from the line 3—3 of Fig. 2.

Fig. 4 is an enlarged top plan view detail of a portion of the device in a succeeding position from that of Fig. 2.

Fig. 5 is another top plan view detail of the elements of Figs. 2 and 4 in a still further shifted view of the operating mechanism showing the device when clutch is disengaged.

Fig. 6 is a view similar to views 4 and 5 showing the operating parts just prior to their return to the home position as shown in the drawings.

The reference numeral 10 indicates generally an agricultural tractor having relatively large rear traction wheels 11 and an elongated body structure 12 extending forwardly therefrom. The forward end of the tractor has not been shown inasmuch as it is of standard construction and forms no part of the present invention. The tractor includes an operator's seat 13 and a rearwardly extending power take-off shaft 14 by which the tractor power may be delivered rearwardly to the operating mechanism of a trailing implement. The tractor further includes a rearwardly extending drawbar 15 to provide a hitch means for trailing implements.

In the present instance the trailing implement is represented as a corn picker 16 which includes forwardly and downwardly extending corn picking elements 17, a frame structure 18 and a forwardly extending hitch member 19 constituting a part of the frame structure. A pin 20 is adapted to provide attaching means between the corn picker hitch 19 and the tractor drawbar 15 thus providing for a pulling medium between the tractor and the trailing corn picker.

The corn picker 16 is provided with a gear box 21 where the various operating elements of the corn picker receive their drive. Rotational power is supplied the gear box 21 from the tractor power take-off shaft 14 through a first universal joint 22, a polygonally shaped shaft 23, a corresponding polygonally shaped sleeve 24 and a second universal joint 25. The purpose of the universal joints 22 and 25 is to permit the tractor to assume relative angular relationships with the corn picker without interfering with the imparting of rotational drive from the tractor power take-off shaft 14 to the corn picker gear box 21. Similarly, these relative movements between the tractor and trailing implements are compensated for by the longitudinal sliding relationship of the shaft 23 with the sleeve 24. It is thus apparent that although the shaft 23 and sleeve 24 may be more or less separated longitudinally depending upon the position of the tractor with respect to the trailing corn picker, there is always provided rotational drive between the shaft and sleeve by reason of the corresponding polygonal shapes of the shaft and sleeve. The gear box 21 is mounted on the frame supporting structure 18 of the implement and, in addition to receiving the rotational drive through a longitudinally disposed shaft 26, there extends therefrom a transversely disposed shaft 27 which fixedly carries a first sprocket 28 and a second sprocket 29. A chain 30 is mounted on the sprocket 28 and imparts rotational drive upwardly and rearwardly to a sprocket 31 mounted on a shaft 32 for delivery of driving means to the corn picker operating elements disposed within the forwardly and downwardly extending gathering elements 17.

Subsequent to the picking and gathering of the corn by the picker elements 17 the harvested ears of corn are deposited in a hopper 33 at the rearward end of the corn picker whereupon the ears are delivered to an upwardly and rearwardly extending wagon elevator 34. A chain 35 is mounted on the sprocket 29 on the outer end of the shaft 27 and at its other end is mounted on a sprocket 36 which, in turn, is carried on a shaft 37 at the lower end of the inclined wagon elevator 34. The shaft 37 is adapted to impart rotational drive to a conveyor, not shown, within the wagon elevator 34. The conveyor is adapted to elevate harvested ears of corn to a substantial height at the rear of the corn picker for depositing in a trailing wagon.

Linkage 38 is provided intermediate the gathering elements 17 and the frame-supporting structure 18 for effecting the desired elevation of the gathering elements 17. A spring member 39 is interposed between the linkage 38 and a fixed point on the supporting structure 18 to effect a normal upward urging of the picker units 17 to provide for proper counter-balancing of the forwardly disposed weight of the gathering units. When the train of vehicles is being turned at the end of a row it is necessary to raise the picker elements 17 to cross over the earth furrows. There is, of course, a change in the angular relationship of the pulling tractor with the corn picker 16 and similarly a change in the angular relationship of the corn picker of a trailing wagon (not shown) which has its tongue 40 attached to a rearwardly extending drawbar or hitch element 41, as shown at 42. During these times of relative angular disposition of the several vehicles the wagon elevator 34 may not be disposed over the receiving box portion of the trailing wagon and hence it is desired to halt movement of the conveyor within the elevator 34 to eliminate the discharge of harvested material, such as ears of corn in the present situation, to the ground. In order that the operator may have complete control of the functioning of the wagon elevator a clutch means 43 is provided in the shaft 37 effecting engagement or disengagement of the tractor power take-off rotational drive with the wagon elevator.

As best shown in Fig. 2, the shaft 37 has the input sprocket 36 mounted on the outer end thereof by means of a pin 44 passing through a collar 45 forming a fixed part of the sprocket 36. A bearing member 46 is mounted over the shaft 37 and is rotatably carried within an opening 47 in a portion 48 of the frame-supporting structure 18. The shaft 37 terminates at 49 and an axially-aligned shaft 50 forms a continuation of the shaft 37 having an end portion 51 abutting the end portion 49 of the shaft 37. The shaft 50 is similarly provided with a bearing member 52 which is carried within an aperture 53 in a portion 54 of the frame-supporting structure 18. The wagon elevator conveyor means (not shown) is mounted on and driven by the outer end 55 of the shaft 50.

The clutch device 43 is in the form of a sleeve disposed over the aligned shafts 37 and 50. There is included in the clutch means a first clutch part 56 which is fixedly attached to the shaft 37 by means of a pin 57, and a second clutch part 58 which forms a part of a bell-shaped housing 59 extending longitudinally and concentric with the aligned shafts 37 and 50. A hub portion 60 is fastened to the shaft 50 by means of the pin 61 and an outer peripheral flange 62 of the hub 60 is driven by a plurality of yieldable tie members 63. A coil spring 64 surrounds the shaft 37 within the bell-shaped housing 59 urging the bell-shaped housing longitudinally of the shaft 37 for normal engagement of the clutch parts 56 and 58. The spring 64 receives its reactance by abutting engagement with a washer 65 which is held in longitudinal position by reason of abutment with a disc shaped tie rod guiding member 66. A plurality of springs 67 are carried on each of the tie rod members 63 between collars 68 and the annular flange 62 of the hub 60. The springs 67 normally urge the tie rods 63 into the apertures 69 in the base flange 70 of the bell-shaped housing 59.

The supporting structure 18 includes a portion 71 which hingedly carries a clutch-actuating fork 72 at 73. The fork 72 includes an extension arm 74 projecting outwardly substantially parallel to the axially-aligned shafts 37 and 50. The arm 74 and the fork 72 thus constitute a bellcrank lever which is pivoted at 73 on the portion 71 of the frame-supporting structure 18. Swinging movement of the arm 74 causes a comparable swinging movement of the clutch-operating fork 72 and engagement or disengagement of the clutch faces 56 and 58. As shown in Fig. 2, the clutch elements 56 and 58 are in engagement, and disengagement will be affected by an upward swinging of the arm 74 in the direction of the arrow 75. Such a movement of the arm 74 will cause an axial movement of the bell-shaped housing 59 against the action of the spring 64, thus releasing the clutch faces 56 and 58 from interengagement.

A generally longitudinally extending rectangular plate 76 is fixedly mounted on the frame-supporting structure 18 by means of bracing arms 77 and 78 which generally span the distance between the supporting structure 48 and 54. The plate member 76 lies in a substantially horizontal plane and is provided with an elongated slot 79 therein which is disposed lengthwise of the entire plate member. The slot 79 has an enlarged end portion 80 which includes an offset to one side thereof, forming a notch or socket 81 spaced apart from the elongated slot 79 and adjacent thereto. A second plate 82 is disposed over the fixed plate 76 and is adapted for slidable movement longitudinally thereover. The slidable plate 82 has a vertically disposed pin 83 affixed thereto for slidable engagement within and along the elongated slot 79 of the stationary plate 76. A spring 84 is anchored at 85 to the frame-supporting member 78 and at its other end is attached at 86 to a lateral extension of the pin 83 disposed beneath the stationary plate 76. The position of attachment of the spring 84 to the extension 87 of the pin 83 which is integrally attached to the slidable plate 82 causes a biasing of the plate 82. In other words the spring 84 which is, in effect, connected to a corner of the plate 82, urges the slidable plate 82 to assume an angular inclination in the direction of the arrow 88.

The plate 82 is provided with an aperture 89 which is angularly inclined with respect to the length of the slidable plate at a position spaced forwardly of the stationary pin 83. The upper or forward end of the aperture 89 is enlarged at 90, somewhat comparable to the enlargement 80 of the elongated slot 79. The enlarged portion 90 projects to the top or forward side of the inclined aperture 89 but distinguishes from the enlarged portion 80 in that it does not have a notch formed adjacent the aperture 89 similar to the notch 81. The forward end of the slidable plate 82 has a circular aperture 91 to receive the end of a flexible cable 92 as shown at 93. In viewing Fig. 1, it is apparent that the flexible cable 92 projects forwardly and is attached at its other end 94 to a position just beneath the tractor operator's seat 13.

In the operation of the device of this invention the tractor operator merely has to pull the flexible cable 92 to effect a change in the drive to the wagon elevator. If the elevator is operating to deliver harvested crop to a trailing wagon and it is desired to terminate this delivery, the operator pulls the flexible cable 92 forwardly a sufficient distance to effect a disengagement of the clutch 43 and thus a stopping of the drive to the wagon elevator. Similarly, if the wagon elevator is in inoperative position, the operator merely pulls the same flexible cable 92 forwardly in the same direction to effect an engagement of the clutch 43. An arm 95 passes loosely through an aperture in the end of the arm 74. Nuts 96 threadedly engage the rearward end of the rodlike arm 95 and abut a vertically disposed flange 97 of the arm 74. The forward end of the rodlike arm is bent downwardly forming an end portion 98, as shown in Fig. 3. This bent portion 98 of the arm 95 passes vertically through the inclined slot 89 of the slidable plate 82 and through the longitudinally disposed slot 79 of the fixed plate 76. A cross pin 99 is employed in the bent portion 98 to maintain engagement of the rod 95 with the plates. When the operator, seated on the tractor, pulls the cable 92 forwardly, the plate 82 is pulled forwardly against the action of the spring 84, and the arm 74 which directly actuates the clutch-moving fork 72 is similarly swung forwardly about its pivot 73 by reason of the plate 82 pulling the bent extension 98 of the arm 95 forwardly therewith. When the bent end 98 comes into abutting position with the end of the elongated slot 79 in the stationary plate 76, as shown in Fig. 4, forward movement of the plate 82 by pulling of the operator must stop, and the operator thereupon slackens his hold on the cable 92, permitting the spring 84 to cause an immediate swinging of the plate 82 to the position as shown in Fig. 5. The bent end extension 98 of the arm 95 thereupon engages the notch 81 in the enlarged end portion 80 of the elongated slot 79. In this forward locked position of the arm 95 the clutch 43 is completely disengaged, whereupon there is no driving engagement between the aligned shafts 37 and 50 and thus also there is no operating movement of the conveyor within the wagon elevator. Now when the operator desires to effect a re-engagement of the clutch 43 he pulls the same cable 92 forwardly again against the action of the spring 84 and, as shown in Fig. 6, the forward movement of the cable tends to straighten the previously inclined plate 82 and the enlarged end 90 of the inclined slot 89 lifts the bent end portion 98 out of the notch 81 and into the elongated portion of the slot 79 whereupon a releasing of the flexible cable 92 by the operator will permit the plate 82 to be slid rearwardly over the stationary plate 76 by operation of the spring 84, thus pulling downwardly on the arm 74 and causing the clutch-engaging fork 72 to effect a re-engagement of the clutch faces 56 and 58.

In order that the plate 82 may assume these various angular relationships with respect to the stationary plate 76, it is necessary for the connecting arm 95 to swing laterally about its attachment to the hinged arm 74. This is accomplished by the loose fitting of the arm 95 through an aperture 100 in the flange 97. The nuts 96 prohibit the longitudinal extension of the arm 95 separately from the arm 74 and thus there is assured a positive forward pulling of the clutch fork actuating arm 74 whenever the flexible cable 92 is pulled forwardly.

It should be apparent that herein is provided a remotely controlled device for effecting the shifting of any mechanical element between spaced-apart limiting positions and that successive pullings of a single rope or flexible cable in the same direction will alternately cause a locking of the member to be moved into either of the limiting positions. In the present instance the device being shifted is a clutch actuator whereupon the remotely positioned operator of a trailing corn picker can effect an engagement and/or disengagement of the conveyor portion of a wagon elevator merely upon the pulling of a single rope member in the same direction in successive order. Thus a single pull of the rope by the operator and a releasing of the rope will place the clutch in a position opposite to which it initially held and, similarly, successive pulls on the same rope will cause alternate engagement and disengagement of the clutch 43.

Numerous details of the construction may be varied throughout a wide range without departing from the principles disclosed herein and I, therefore, do not propose limiting the patent granted hereon otherwise than as necessitated by the appended claims.

What is claimed is:

1. A remote control operator for a device having two positions of movement comprising a supporting structure, a member hinged to said supporting structure for swinging movement between two limiting positions, a plate fixed to said supporting structure, said plate having an elongated aperture therein, said elongated aperture having an enlarged portion located at the end and at one side thereof, said enlarged portion forming a notch spaced from and separated from the elongated aperture, a second plate adapted for slidable movement over said fixed plate, a pin on and forming a part of said second plate and arranged and constructed to slidably engage the elongated aperture in said fixed plate, said second plate having an aperture therein disposed at an inclined angle with respect to the length of the fixed plate, said aperture having an enlarged end portion located at the end and side of said inclined aperture, an arm anchored to said hinged member for free sidewise movement and fixed longitudinal movement, said arm having a bent end portion arranged and constructed to pass through intersecting portions of said elongated and inclined apertures, a spring anchored at one end to said supporting structure and at its other end to a corner of said second plate whereby the spring normally urges a biasing of said second plate, and a flexible cable pull device fastened to one end of said second plate whereby successive pullings with alternate releasings results in alternate positioning of said hinged member in either of two limiting positions therefor.

2. A remote control operator comprising a stationary structure, a member hinged on said stationary structure for swinging movement between spaced limiting positions, a first plate having a slot therein fixed to said stationary supporting structure, a second plate having a slot therein adapted for sliding movement over said first plate from a first starting position, said second plate having a pin integrally attached thereto, said pin adapted to engage and be guided within the slot in said first plate, a second pin carried by said hinged member for limited relative movement with respect thereto, said second pin adapted to pass through aligned portions of the overlying slots of the first and second plates and upon movement thereof to effect a comparable movement of said hinged member, said first plate slot having a notch at one end thereof, means for sliding said second plate over said first plate, and means effecting engagement of said second pin in said notch of said first plate slot whereby the second plate is locked in a second position with respect to said first plate and the hinged member is in another limiting position of its movement.

3. A device as set forth in claim 2 in which the means for sliding said second plate includes a flexible cable.

4. A device as set forth in claim 2 in which the means for effecting engagement of said second pin in the notch of the first plate includes a spring biased between said second plate and said stationary structure.

5. A device as set forth in claim 2 in which the slot in said second plate is angularly disposed diagonally across said first plate and has an enlarged opening at the end and to one side thereof whereby a successive actuating of the means to cause sliding of said second plate with respect to said first plate causes a disengagement of said second pin from said notch to effect a movement of said second plate and said hinged member to their original positions.

JOHN L. AASLAND.

References Cited in the file of this patent
UNITED STATES PATENTS

| Number | Name | Date |
| --- | --- | --- |
| 2,341,170 | Aasland | Feb. 8, 1944 |
| 2,621,538 | Bechman et al. | Dec. 16, 1952 |